Patented Jan. 29, 1946

2,393,870

UNITED STATES PATENT OFFICE 2,393,870

DIRECT PRODUCTION OF RUBBER HYDROCHLORIDE

Howard F. Reeves, Jr., and Troy M. Andrews, Weeks, La., assignors to Bay Chemical Company, Inc., New Orleans, La., a corporation of Louisiana No Drawing. Application September 24, 1941, Serial No. 412,200

13 Claims. (Cl. 260—771)

This invention pertains to manufacturing rubber hydrochloride from rubber.

Rubber hydrochloride for several years has been assuming increasing importance in various industries, particularly where thin films or foils are useful for packaging or for moisture-proofing articles. This material is flexible and tough and also transparent. Moreover, it resists absorption of moisture to such extent that contents wrapped in such films are kept dry. However, in commercial production the cost of rubber hydrochloride is considerable; in fact, so considerable as seriously to limit its use.

Rubber hydrochloride is a composition that results from reaction of hydrogen chloride with rubber. This reaction alters the nature of certain unsaturated molecular bonds of rubber and adds hydrogen and chlorine to the rubber. The amount of this addition, however, may vary. For commercially valuable purposes rubber hydrochloride should contain from about 27 to 32 percent chlorine from added hydrogen chloride.

One method heretofore proposed for preparing rubber hydrochloride requires the rubber to be dissolved and then to be reacted in solution with hydrogen chloride. Another method has been proposed to react rubber with hydrogen chloride gas under high pressure or else with liquid hydrogen chloride.

When rubber in solution is reacted with hydrogen chloride, the concentrations involved are severely limited. Such limitation is imposed partly by the fact that these solutions become highly viscous. They become virtually viscous cements. To prepare these solutions requires equipment with agitators or other moving parts. The amount of solvent required may be 10 to 25 times as much as the reacting substances. This entails equipment to recover such large amounts of solvents, and requires also expensive, voluminous and acid-proof reacting equipment.

Similarly, where hydrogen chloride under pressure has been applied to sheets of rubber, the manufacturing equipment has been expensive, because required to be pressure-proof and to withstand severe tendencies to corrosion. Efforts to reduce costs of production under these circumstances appear to be limited.

A difficulty of reacting solid rubber with hydrogen chloride is that the reaction has proceeded very slowly. Particularly at atmospheric pressure the reaction in gaseous hydrogen chloride not only is exceedingly slow, but is incomplete in any reasonable time. For example, sheets of crepe rubber $\frac{1}{32}$ inch thick after exposure for 72 hours to pure hydrogen chloride gas at atmospheric pressure yielded rubber hydrochloride of only 20.4 percent chlorine content. This is far below the requisite 27 to 32 percent chlorine content. Moreover, in such a sheet the interior may be of markedly different composition from the exterior and may contain practically no rubber hydrochloride. The entire structure, therefore, is of uncertain nature.

An object of this invention is to simplify the transformation of rubber to rubber hydrochloride.

A further purpose is to avoid requirements for expensive equipment, equipment with moving parts, or such special apparatus as is needed in present solution methods of forming rubber hydrochloride, and also to avoid the precautions and the expense and the special equipment where hydrogen chloride in liquid form or under pressure is used as reagent.

A further purpose involved in this invention is to accelerate reaction so as to produce rubber hydrochloride from rubber in a minimum of time. Nevertheless this invention is to carry on the hydrochloridizing of solid rubber at atmospheric pressure and at temperatures of about 15 to 35° C.

A general purpose is to reduce the cost of rubber hydrochloride and a further purpose is to assure improved uniformity in quality in articles of rubber hydrochloride.

Particularly this invention is directed to converting rubber sheets directly into rubber hydrochloride.

This is desirable because rubber hydrochloride is not readily molded into shapes. Consequently, under this invention articles may be shaped from rubber and then without distortion be converted to rubber hydrochloride.

Various benefits of this invention are attained by causing solid rubber to react with vapor containing hydrogen chloride in the presence of penetrant. Preferably such penetrant comprises solvent or softener for both rubber and rubber hydrochloride.

The penetrant may be solvent or softener for rubber alone or it may be solvent or softener for rubber hydrochloride alone. The term "solvent" is used hereinafter in the specification and claims to include not merely solvents strictly speaking, but also softening agent. Where the penetrant is solvent for rubber, but not for rubber hydrochloride, it is preferable that it be also solvent for hydrogen chloride.

The penetrant agent may be applied in the gaseous phase and at atmospheric pressure or may be applied as spray, so the HCl gas acts in the presence of the penetrant. Penetrant may also be applied in other ways, for example, as by dipping sheets in penetrant and then applying the HCl gas. However, these various ways require only small concentrations and ordinary pressures and ordinary equipment.

A preferred embodiment of this invention will be described somewhat in greater detail for the purpose of illustrating the broad principles and various ramifications of this invention. Under this specific example several sheets of rubber are suspended in an atmosphere of HCl gas.

It may be observed that when rubber is wetted with even a small amount of penetrant, the surface becomes sticky. Consequently the various sheets or other articles under treatment should be maintained separate from each other. It has been observed that even when the surface in contact with penetrant becomes softened it appears to permit diffusion of hydrogen chloride instead of fusing and excluding that reagent. However, the sheet tends to become weakened and to distort. Consequently, it is preferred to apply both the solvent penetrant and the HCl as vapor gradually.

As an example, five sheets of crepe rubber, each $\frac{1}{32}$ inch thick and totalling in weight 51 grams were suspended in a vessel adapted to contain gaseous HCl. These sheets were spaced from each other so as to leave all surfaces free for contact with the agents applied. To obtain rubber hydrochloride of about 30% chlorine content, each square inch of surface of these sheets required about 0.1 grams of hydrogen chloride. This was introduced in the following manner: First, 50 cc. of benzene was placed in the vessel containing the sheets but out of contact with the rubber. Then the vessel was evacuated rapidly to absolute pressure of about 9 cm. of mercury. Hydrogen chloride gas was introduced until atmospheric pressure was restored at a temperature of about 20 to 25° C. Atmospheric pressure was maintained for 50 hours by introduction of HCl gas to replenish that consumed. Then the sheets were removed. They weighed 100 grams and contained some penetrant. The benzene penetrant was removed by exposing the sheets to steam. These sheets had become rubber hydrochloride throughout and were found to contain 30.2 percent chloride. The course of the reaction was observed to turn the rubber sheets pink after several minutes' contact with the hydrochloride and then a dark purple by the time the reaction was completed.

During treating of the sheets with steam their color changed to a light cream. The sheets were tough, flexible and non-tacky. They showed no tendency to stick to each other during steaming nor during subsequent drying in a vacuum.

For further example, five sheets of crepe rubber $\frac{1}{32}$ inch thick weighing 58 grams were suspended separate from each other in a vessel containing 50 cc. of ethylene dichloride. The vessel was evacuated and hydrogen chloride introduced to restore atmospheric pressure. Hydrogen chloride was supplied to maintain the system at atmospheric pressure at a temperature of 25 to 30° C. for 50 hours. When the hydrochloride sheets which were dark purple were removed they weighed 115 grams total. Of this weight, 28 grams of ethylene dichloride was removed by a current of warm air. The sheets were tough and light colored, were composed of rubber hydrochloride and contain 29.0 percent chlorine.

For example, five sheets of crepe rubber about $\frac{1}{32}$ inch thick each, weighing 57 grams total, were suspended over 50 cc. of isopropyl ether. Isopropyl ether is solvent for rubber and for hydrogen chloride, though not for rubber hydrochloride. Air was removed by vacuum pump and subsequent admission of hydrogen chloride, restoring the pressure to atmospheric. Atmospheric hydrogen chloride pressure was maintained about 47 hours. The sheets of rubber hydrochloride and solvent then weighed 105 grams. The solvent was removed by steaming and subsequent drying. The rubber hydrochloride then contained 30.1% chlorine.

It will be observed that both the penetrant and the reagent HCl are applied in exceedingly uniform manner because applied in gas phase. As a result distortion of the article is avoided. Thus, if desired, the article may first be shaped from rubber and then converted to the rubber hydrochloride without material alteration of form.

This gaseous atmosphere may be prepared in other ways than that described, for example by passing HCl gas through the penetrant at such temperature as to provide the desired partial pressure of penetrant with the HCl gas. This affords somewhat better control of the penetrant than when the penetrant is sprayed on to the article or otherwise applied as liquid. But various ways of assuring the presence of penetrant during the action of gaseous HCl will now occur to those skilled in this art.

For removing penetrant from the finished article use of steam or of a current of air is illustrative, but preferred practice under this invention is not limited since the penetrant may be removed in other ways. In fact, in some cases, it may not be necessary to remove penetrant. For example, where the resulting rubber hydrochloride is to be cast from benzene solution, the rubber hydrochloride containing benzene may simply be dissolved in additional benzene to form the solution for casting. In this case penetrant used during formation of the rubber hydrochloride must be compatible with whatever solvent is employed for casting or for filming the rubber hydrochloride.

Excess HCl may exist to some slight degree in the finished sheets, but may be neutralized with satisfactory results by dry ammonia gas. Preferably, the ammonia gas is admitted to fill the reaction vessel at atmospheric pressure after free hydrogen chloride gas has been removed from the vessel. The sheets yet contain the penetrant. After about 2 hours exposure to the ammonia gas the sheets of rubber hydrochloride had changed from opaque dark purple to translucent cream color. They contained no free hydrogen chloride. The penetrant is removed as previously described. This type of neutralization is especially important when preformed rubber is converted to rubber hydrochloride, for it avoids distortion and avoids deterioration.

Economies may be effected to avoid loss of penetrant or of HCl left in the reaction vessel by treating fresh sheets with these residual gases before applying an atmosphere of the final concentrations to be used. In effect, this is countercurrent treatment, which may be elaborated as desired. Where air has entered a reaction chamber it may be swept out with hydrogen chloride instead of by imposing a vacuum.

Designation of the thickness of the sheets in the examples given as $\frac{1}{32}$ inch is not limiting, but is used because this is a common thickness of crude sheets of crepe rubber as received in commerce. Thicker sheets may be used or thinner sheets may be used. Nor is this invention limited to crepe rubber. Milled rubber sheets or reclaimed rubber may be treated likewise. Moreover, rubber containing pigments, fillers, softeners, etc., that are not destroyed by hydrogen chloride and by penetrants may be used in this process.

Purification if desired, however, may be accomplished by suitable treatment before conversion to rubber hydrochloride, for example by extraction, or after conversion to rubber hydrochloride by extraction with alcohols or ketones or otherwise. But the product even without purification is capable of forming excellent films.

Another variation which may be introduced under this invention within equivalence to hydrogen chloride is the use of hydrogen bromide or of hydrogen iodide in whole or in part for the hydrogen chloride. Also, conversion may be varied by variation of solvents, concentrations and temperatures according to the particular objects sought. Moreover, this invention is not limited to atmospheric pressure though atmospheric pressure is sufficient and therefore is preferred.

Although examples of suitable penetrants mention benzene and ethylene dichloride and isopropyl ether, it is intended that other penetrants may be used that may or may not so readily soften rubber or rubber hydrochloride.

Low-boiling aromatic solvents usually are useful, or chlorinated aliphatic solvents. Such are ethylene dichloride or chloroform.

One advantage of the present invention is that only a relatively small proportion of penetrant is needed. Ordinarily one part of penetrant to one part of product is preferred, but a total amount of penetrant of about half the weight of rubber is satisfactory.

While in accordance with the patent statutes we have set forth the principles of this invention and have illustrated a preferred practice thereof by specific example, it will now be apparent to those skilled in the art that modifications may be made within the scope of the appended claims.

What we claim is:

1. A process of converting rubber to rubber hydrochloride comprising contacting rubber with gaseous hydrogen chloride in the presence of a penetrant in vapor phase said penetrant being a solvent for rubber and for hydrogen chloride.

2. A process of converting rubber to rubber hydrochloride comprising contacting rubber with gaseous hydrogen chloride in the presence of a penetrant in vapor phase said penetrant being a solvent for rubber.

3. A process in accordance with claim 1 in which the temperature is not substantially in excess of 350° C. and the pressure is not substantially in excess of atmospheric.

4. A process of converting rubber to rubber hydrochloride comprising contacting rubber with gaseous hydrogen chloride in the presence of a penetrant in vapor phase, said penetrant being selected from the group consisting of low-boiling aromatic solvents, chlorinated aliphatic solvents and isopropyl ether.

5. A process in accordance with claim 4 in which the amount of penetrant employed is insufficient to cause substantial distortion of the rubber.

6. A process in accordance with claim 4 in which the penetrant is benzene.

7. A process in accordance with claim 4 in which the penetrant is ethylene dichloride.

8. A process in accordance with claim 4 in which the penetrant is isopropyl ether.

9. A process in accordance with claim 11 in which the penetrant is selected from the group consisting of low-boiling aromatic solvents, chlorinated aliphatic solvents and isopropyl ether.

10. A process of forming a shaped article of rubber hydrohalide, comprising shaping the article of rubber and then converting the shaped article to rubber hydrohalide without substantial distortion of the shape, by exposing said article to gaseous halide selected from the group of hydrogen chloride, hydrogen bromide, and hydrogen iodide, and penetrant in vapor phase, said penetrant being a solvent for rubber and for aforementioned hydrogen halide.

11. A process of forming a shaped article of rubber hydrochloride, comprising shaping the article of rubber and then converting the shaped article to rubber hydrochloride without substantial distortion of the shape, by exposing said article to gaseous hydrogen chloride and penetrant in vapor phase, said penetrant being a solvent for rubber and for hydrogen chloride.

12. A process in accordance with claim 11 in which the penetrant is benzene.

13. A process of converting rubber to rubber hydrohalide comprising contacting rubber with gaseous material selected from the group consisting of hydrogen chloride, hydrogen bromide, and hydrogen iodide, and a penetrant in vapor phase, said penetrant being a solvent for rubber and for aforementioned hydrogen halide.

HOWARD F. REEVES, Jr.
TROY M. ANDREWS.